(12) United States Patent
Lei et al.

(10) Patent No.: US 12,127,648 B2
(45) Date of Patent: Oct. 29, 2024

(54) PROTECTIVE LEATHER CASE AND POSITIONING DEVICE

(71) Applicant: Shenzhen Romoss Technology Co., LTD, Guangdong (CN)

(72) Inventors: Guibin Lei, Guangdong (CN); Bin Yao, Guangdong (CN); Shuilin Lai, Guangdong (CN)

(73) Assignee: SHENZHEN ROMOSS TECHNOLOGY CO., LTD., Guangdong (CN)

( * ) Notice: Subject to any disclaimer, the term of this patent is extended or adjusted under 35 U.S.C. 154(b) by 918 days.

(21) Appl. No.: 17/271,187

(22) PCT Filed: Oct. 20, 2020

(86) PCT No.: PCT/CN2020/122190
§ 371 (c)(1),
(2) Date: Feb. 24, 2021

(87) PCT Pub. No.: WO2021/238031
PCT Pub. Date: Dec. 2, 2021

(65) Prior Publication Data
US 2022/0304436 A1 Sep. 29, 2022

(30) Foreign Application Priority Data
May 29, 2020 (CN) .......................... 202020946993.2

(51) Int. Cl.
*A45C 11/00* (2006.01)
*B29C 63/00* (2006.01)
*B29C 63/02* (2006.01)
*B29L 31/34* (2006.01)

(52) U.S. Cl.
CPC .......... *A45C 11/00* (2013.01); *B29C 63/0004* (2013.01); *B29C 63/02* (2013.01); *A45C 2011/002* (2013.01); *A45C 2011/003* (2013.01); *B29K 2911/08* (2013.01); *B29L 2031/34* (2013.01)

(58) Field of Classification Search
CPC .............. A45C 11/00; A45C 2011/003; B29C 2011/002; B29C 63/102; B29C 63/0004
See application file for complete search history.

(56) References Cited

FOREIGN PATENT DOCUMENTS

| CN | 104095379 A | 10/2014 |
|---|---|---|
| CN | 105416663 A | 3/2016 |
| CN | 205854603 U | 1/2017 |
| CN | 206384203 U | 8/2017 |
| CN | 206551589 U | 10/2017 |

(Continued)

*Primary Examiner* — Sue A Weaver
(74) *Attorney, Agent, or Firm* — Workman Nydegger

(57) ABSTRACT

The present application relates to a protective leather case and a positioning device for protecting a smart terminal. The protective leather case includes a leather layer; an adhesive layer; and a positioning release film including a first release film and a second release film. The leather layer, the adhesive layer and the positioning release film are laminated sequentially. The first release film is provided in a first direction. At least two second release films are provided, and are arranged on both sides of the first release film in a second direction perpendicular to the first direction. The protective leather case can be used to facilitate accurate positioning and lamination between the protective leather case and the smart terminal.

5 Claims, 3 Drawing Sheets

(56) References Cited

FOREIGN PATENT DOCUMENTS

| | | |
|---|---|---|
| CN | 202211303 U | 5/2019 |
| CN | 209582394 U | 11/2019 |
| CN | 209738281 U | 12/2019 |
| KR | 102060112 B1 | 2/2020 |

PROTECTIVE LEATHER CASE AND POSITIONING DEVICE

The present application is a 371 US Nationalization of PCT International Patent Application No. PCT/CN2020/122190, filed Oct. 20, 2020, which claims priority to Chinese Patent Application No. 2020209469932, filed May 29, 2020. The disclosures of the aforementioned applications are incorporated herein in their entireties.

TECHNICAL FIELD

The present disclosure relates to a technical field of smart terminals, in particular, to a protective leather case and a positioning device.

BACKGROUND

With the rapid development of Internet and mobile Internet, demands of various mobile Internet users are increasing. Smart terminals have been greatly promoted and popularized, and the number of its users continues to rise. Smartphones, a type of smart terminal, have become an indispensable social tool for people's daily work and relationship maintenance. Until December 2017, the number of smartphone Internet netizens in China has reached 753 million, which is an increase of 53.74 million compared with 2016. A proportion of people who uses smartphones to access the Internet in netizens has increased by 2.4% compared with 2016. With the promotion and popularization of intelligent electronics, the proportion of the phone netizens in China will continue to rise in 2018.

At present, a smartphone usually includes a whole screen and glass back panel. Consumers use smart phones very frequently. It is inevitable that the smartphones will be missed or accidentally broke, resulting in mobile phone protection accessories, such as tempered screen protector, and mobile phone cases. The mobile phone cases are mostly formed by an injection molding with a plastic, which does not feel good and is relatively cheap. Some consumers will choose to use leather protective leather cases. There is an adhesive-type protective leather cases in the market, which is a leather layer as a whole with an adhesive layer in the middle. The adhesive layer is covered with a release film. When the adhesive-type protective leather case is in use, the release film is removed, and the leather layer is adhered onto a phone to protect the phone. However, there is a problem with such protective leather cases, which is in that when the release film is removed to perform an adhesion, the protective leather cannot be accurately laminated to the phone due to various reasons. Moreover, since most area of the leather case are already adhered, it is more laborious to repeat the adhesion, and after completing the adhesion, the adhesive layer has no original adhering effect due to repeated adhering.

SUMMARY

According to various embodiments of the present application, a protective leather case is provided, and includes:
  a leather layer;
  an adhesive layer; and
  a positioning release film, wherein the leather layer, the adhesive layer and the positioning release film are laminated sequentially. The positioning release film comprises a first release film and a second release film. The first release film is provided in a first direction. At least two second release films are provided. The at least two second release films are arranged on both sides of the first release film in a second direction perpendicular to the first direction.

In one of the embodiments, an area of the second release film is less than an area of the first release film.

In one of the embodiments, four second release films are provided, which are a left front release film provided on a left front side of the first release film, a right front release film provided on a right front side of the first release film, a left rear release film provided on a left rear side of the first release film, and a right rear release film provided on a right rear side of the first release film, respectively.

In one of the embodiments, an edge of the first release film is provided with a first protrusion protruding from the leather layer.

In one of the embodiments, an edge of the second release film is provided with a second protrusion protruding from the leather layer.

In one of the embodiments, the second release film includes a left front release film provided on a left front side of the first release film, and a left rear release film provided on a left rear side of the first release film. The left front release film and the left rear release film are adjacent. The second protrusion of the left front release film and the second protrusion of the left rear release film are also adjacent.

In one of the embodiments, the second release film includes a right front release film provided on a right front side of the first release film, and a right rear release film provided on a right rear side of the first release film. The right front release film and the right rear release film are adjacent. The second protrusion of the right front release film and the second protrusion of the right rear release film are also adjacent.

In one of the embodiments, the leather layer incudes a first main body portion configured to be attached to a rear side of a smart terminal and a first surrounding portion configured to be attached to a side of the smart terminal. The positioning release film incudes a second main body portion configured to be attached to the first main body portion and a second surrounding portion configured to be attached to the first surrounding portion.

In one of the embodiments, the leather layer is provided with a first opening corresponding to at least one of a camera, a charging interface, a receiver, and a button of a smart terminal. The positioning release film is provided with a second opening corresponding to at least one of the camera, the charging interface, the receiver, and the button of the smart terminal.

The present application further provided a positioning device used in conjunction with the protective leather case as described above, which includes a positioning piece provided with a positioning boss that matches a charging interface of a smart terminal. The leather layer is provided with a first charging interface opening that matches the charging interface of the smart terminal. The positioning release film is provided with a second charging interface opening that matches the charging interface of the smart terminal. The positioning boss is configured to extend through the first charging interface opening and the second charging interface opening, so as to position the leather layer, the positioning release film and the smart terminal.

In one of the embodiments, the positioning piece is further provided with a positioning hole that matches a receiver of the smart terminal. The leather layer is provided with a first receiver hole that matches the receiver of the smart terminal.

The positioning release film is provided with a second receiver hole that matches the receiver of the smart terminal.

In one of the embodiments, the positioning device further includes a holding piece. A side of the holding piece is fixedly connected to the positioning piece.

In one of the embodiments, the holding piece and the positioning piece are an integrally formed sheet structure.

In one of the embodiments, the positioning device is made of a transparent material.

The details of one or more embodiments of the present application are set forth in the following drawings and description. Other features, objects and advantages of the present application will be apparent from the description, drawings and claims.

In order to better describe and illustrate embodiments and/or examples of those applications disclosed herein, one or more drawings may be referred to. The additional details or examples used to describe the drawings should not be considered as limiting the scope of any one of the disclosed applications, the currently described embodiments and/or examples, and the best mode of those applications currently understood.

DETAILED DESCRIPTION OF THE EMBODIMENTS

In order to facilitate the understanding of the present application, a protective leather case will be described more fully with reference to the relevant drawings. Preferred embodiments of the protective leather case are shown in the attached drawings. However, the protective leather case can be implemented in many different forms and is not limited to the embodiments described herein. On the contrary, providing these embodiments is to make the disclosure of the protective leather case more thorough and comprehensive.

Unless otherwise defined, all technical and scientific terms used herein have the same meaning as commonly understood by those skilled in the technical field of the present application. Terms used in the description of the protective leather case herein is only for the purpose of describing specific embodiments, and is not intended to limit the present application.

Figure 1:
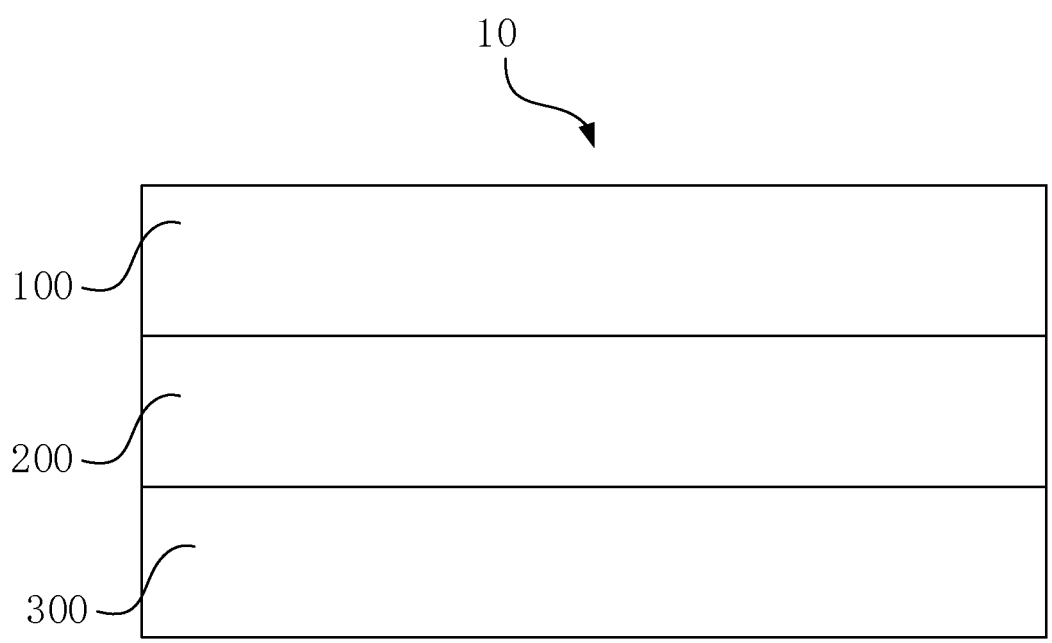
FIG. 1 is a schematic view of a protective leather case according to an embodiment.
Figure 2:
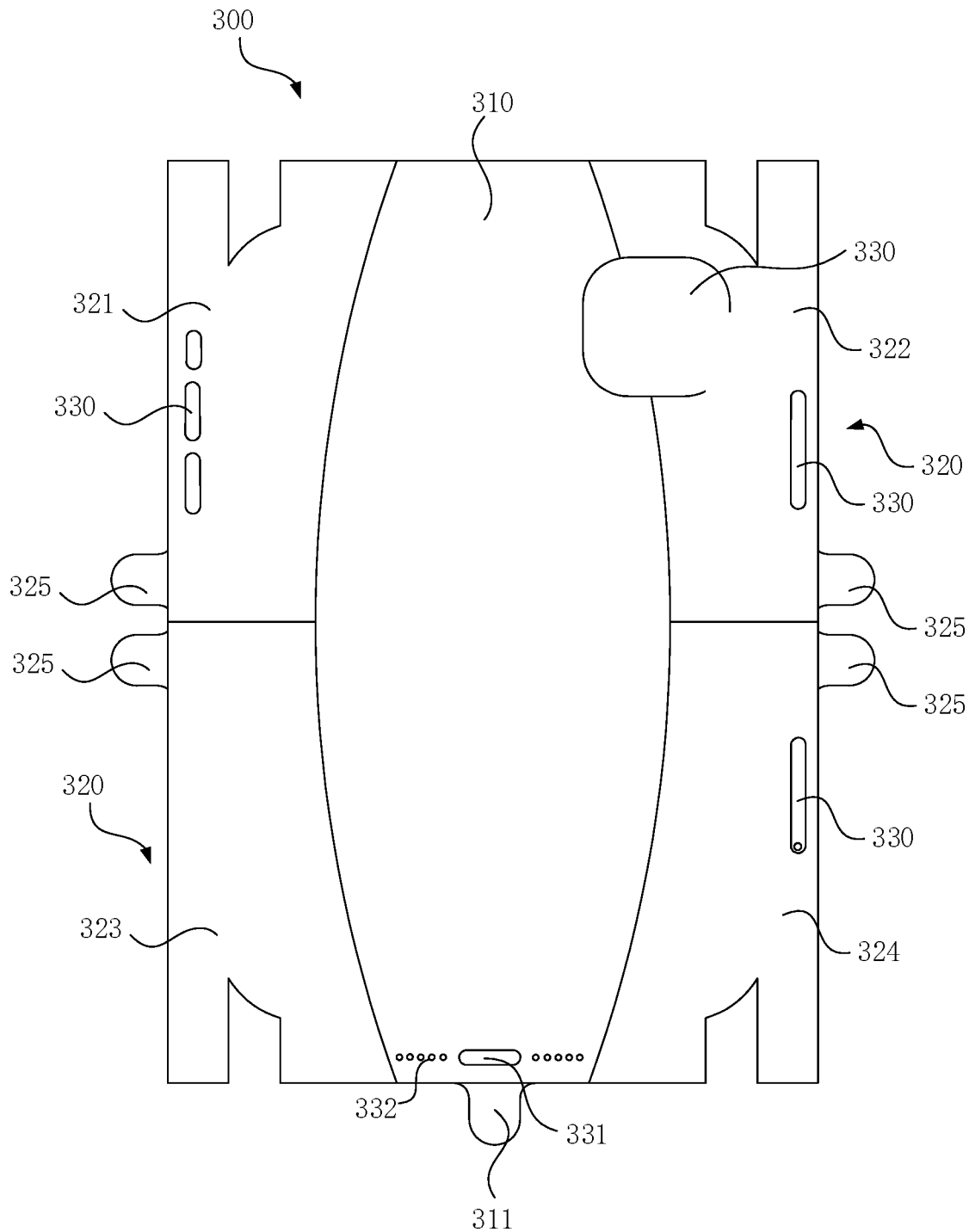
FIG. 2 is a schematic view of a positioning release film in FIG. 1.

As shown in FIGS. 1 and 2, a protective leather case 10 according to an embodiment is used to protect a smart terminal, and includes a substantially rectangular leather layer 100, an adhesive layer 200, and a positioning release film 300. The leather layer 100, the adhesive layer 200 and the positioning release film 300 are laminated sequentially. The positioning release film 300 includes a first release film 310 and a second release film 320. The first release film 310 is provided in a first direction. At least two second release films 320 are provided. The at least two second release films 320 are arranged on both sides of the first release film 310 in a second direction. The first direction is perpendicular to the second direction. In this embodiment, the first direction is a length direction of the smart terminal, and the second direction is a width direction of the smart terminal.

The protective leather case 10 of the present disclosure facilitates the user to accurately attach the leather layer 100 to the smart terminal. When the user obtains the protective leather case 10, the release film is firstly removed, and the protective leather case 10 is adhered onto the smart terminal via the adhesive layer 200, so as to protect the smart terminal. Firstly, the user aligns the protective leather case 10 with the smart terminal, and removes the first release film, such that the protective leather case 10 is adhered onto the smart terminal. If the position is found to be offset at this point, it can be readjusted. Since an area of the first release film 310 is relatively small, it has a relatively limited adhesive force, which is convenient for adjustment. When the adjustment is done and it is determined that the leather layer 100 is aligned with the smart terminal, at least two second release films 320 are removed in sequence, then the entire leather layer 100 is adhered onto the smart terminal via the adhesive layer 200.

Specifically, an area of the second release film 320 is less than the area of the first release film 310. Such a configuration is convenient to remove the second release film 320 piece by piece after finishing the fine adjustment of the first release film 310, thus the attachment of the entire leather layer 100 to the smart terminal is gradually realized, so as to further ensure the accurate adhesion of the leather layer 100.

Specifically, as shown in FIG. 2, four second release films 320 are provided, which are a left front release film 321 provided on a left front side of the first release film 310, a right front release film 322 provided on a right front side of the first release film 310, a left rear release film 323 provided on a left rear side of the first release film 310, and a right rear release film 324 provided on a right rear side of the first release film 310, respectively. Such a configuration can facilitate the user to remove the second release film 320 from multiple directions, so as to further ensure the accurate adhesion of the leather layer 100.

Further, an edge of the first release film 310 is provided with a first protrusion 311 protruding from the leather layer 100. An edge of the second release film 320 is provided with a second protrusion 325 protruding from the leather layer 100. Such a configuration allows the user to easily remove the first release film 310 by just grabbing the first protrusion 311 for peeling, and to easily remove the second release film 320 by just grabbing the second protrusion 325 for peeling, when removing the positioning release film 300.

In some embodiments, the left front release film 321 and the left rear release film 323 are adjacent, and the second protrusion 325 of the left front release film 321 and the second protrusion 325 of the left rear release film 323 are also adjacent. Similarly, the right front release film 322 and the right rear release film 324 are adjacent, and the second protrusion 325 of the right front release film 322 and the second protrusion 325 of the right rear release film 324 are also adjacent. As such, after the positioning release film 300 is adhered, the second protrusions corresponding to the left front release film 321, the right front release film 322, the left rear release film 323, and the right rear release film 324 are grabbed and peeled sequentially, such that the left front release film 321, the right front release film 322, the left rear release film 323, and the right rear release film 324 can be removed. Since the second protrusion 325 of the left front release film 321 is adjacent to the second protrusion 325 of the left rear release film 323, the second protrusion 325 of the right front release film 322 is also adjacent to the second protrusions 325 of the right rear release film 324, both of the second release film 320 located on the left side of the first release film 310 and the second release film 320 located on the right side of the first release film 310 are removed from the middle to both sides. That is, the leather layer 100 is also adhered onto the smart terminal from the middle to both sides. Such a configuration can further ensure the adhering effect of the leather layer 100.

Further, the leather layer 100 includes a first main body portion configured to be attached to a rear side of the smart terminal and a first surrounding portion configured to be attached to a side of the smart terminal. The positioning release film 300 includes a second main body portion configured to be attached to the first main body portion and a second surrounding side portion configured to be attached to the first surrounding portion. In this embodiment, the second surrounding side portion includes a front side portion located on the front side of the second main body portion, a rear side portion located on the rear side of the second main body portion, a left side portion located on the left side of the second main body portion, and a right side portion located on the right side of the second main body portion. The front side portion includes front side edges of the first release film 310, the left front release film 321, and the right front release film 322. The rear side portion includes rear side edges of the first release film 310, the left rear release film 323, and the right rear release film 324. The left side portion includes left side edges of the left front release film 321 and the left rear release film 323. The right side portion includes right side edges of the right front release film 322 and the right rear release film 324.

Further, the leather layer 100 is provided with a first opening corresponding to at least one of camera, a charging interface, a receiver, a button and the like of the smart terminal. The positioning release film 300 is provided with a second opening 330 corresponding to at least one of the camera, the charging interface, the receiver, the button and the like of the smart terminal. When the protective leather case 10 is adhered to the smart terminal, both the first opening and the second opening 330 can match the aforementioned camera, charging interface, receiver, button and the like, so as to ensure a normal use of the camera, the charging interface, the receiver, the button and the like of the smart terminal.

Figure 3:
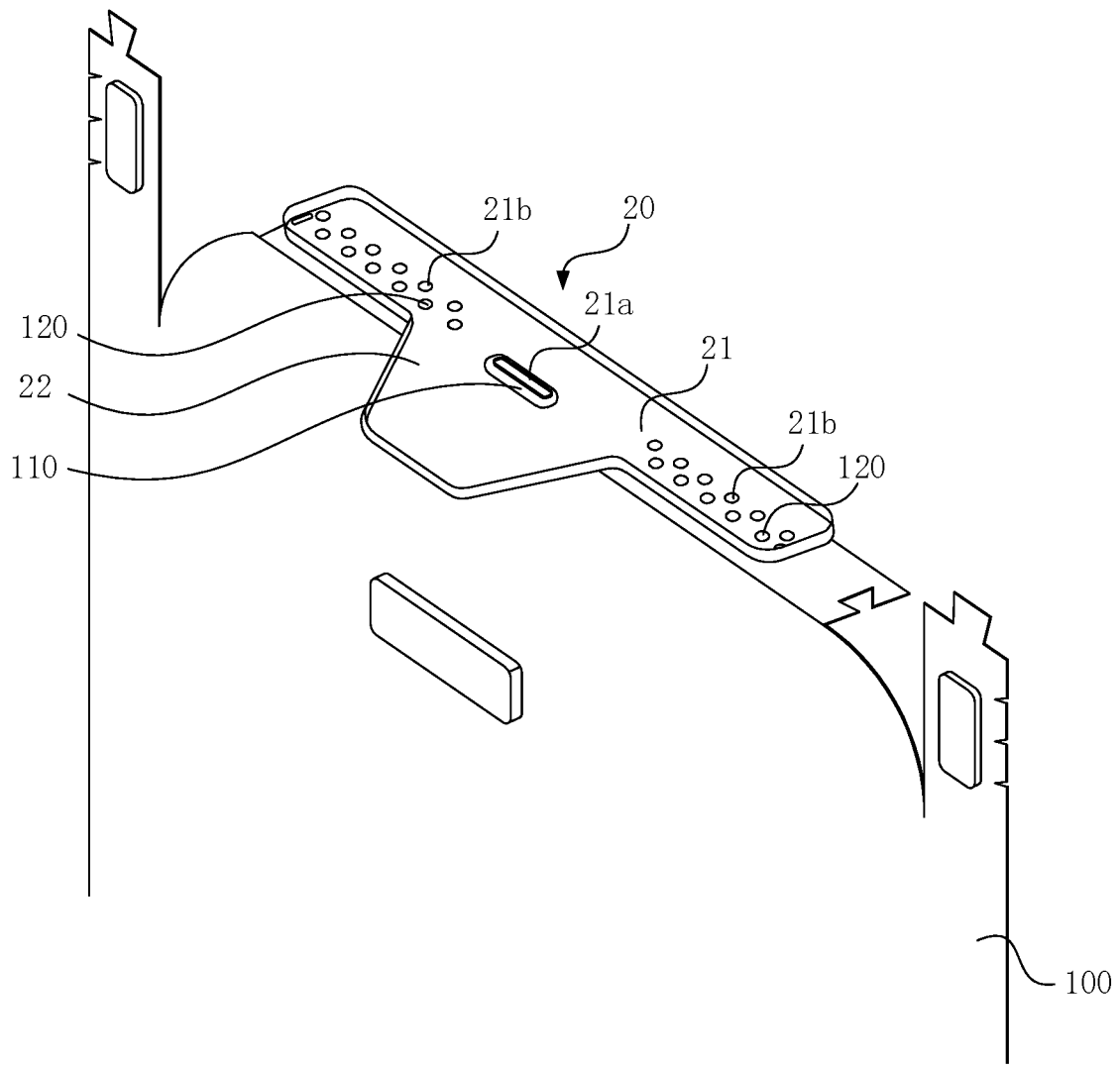
FIG. 3 is a schematic view of a positioning device and a protective leather case according to an embodiment.

As shown in FIG. 3, a positioning device 20 used in conjunction with the aforementioned protective leather case 10 is provided, which includes an elongated positioning piece 21. The positioning piece 21 is provided with a positioning boss 21a that matches the charging interface of the smart terminal. The leather layer 100 is provided with a first charging interface opening 110 that matches the charging interface of the smart terminal. The positioning release film 300 is provided with a second charging interface opening 331 that matches the charging interface of the smart terminal. The positioning boss 21a is used to extend through the first charging interface opening 110 and the second charging interface opening 331, so as to position the leather layer 100, the positioning release film 300 and the smart terminal.

Further, the positioning piece 21 is further provided with a positioning hole 21b that matches the receiver of the smart terminal. The leather layer 100 is provided with a first receiver hole 120 that matches the receiver of the smart terminal. The positioning release film 300 is provided with a second receiver hole 332 that matches the receiver of the smart terminal.

The aforementioned positioning device 20 is to assist the use of the protective leather case 10 provided by the present disclosure during adhering. By providing the positioning boss 21a on the positioning device 20, the first charging interface opening 110 can correspond to the second charging interface opening 331, so as to correspond the position of the protective leather case 10 to the smart terminal. Then, the relative positions of the protective leather case 10 and the smart terminal can be fine adjusted according to the matching of the positioning hole 21b with the first receiver hole 120, the second receiver hole 332, and the receiver of the smart terminal, thus achieving an optimal matching between the protective leather case 10 and the smart terminal.

Further, the positioning device 20 further includes a holding piece 22. A side of the holding piece 22 is fixedly connected to the positioning piece 21. Providing the holding piece 22 can facilitate the use of the positioning device 20. When using the positioning device 20, the user can hold the holding piece 22 of the positioning device 20 to enable the positioning boss 21a of the positioning device 20 to extend through the first charging interface opening 110 and the second charging interface opening 331, so as to position the leather layer 100, the positioning release film 300, and the smart terminal. After roughly fixing the positions of the leather layer 100, the positioning release film 300, and the smart terminal, and the matching of the first receiver hole 120, the second receiver hole 332 and the receiver of the smart terminal is observed through the positioning hole 21b. If it is found that the position of the protective leather case 10 is deviated from the position of the smart terminal, fine adjustments can be performed to ensure that the protective leather case 10 is accurately adhered onto the smart terminal.

Optionally, the positioning device 20 is made of a transparent material, which facilitates the user to observe. Specifically, the positioning device 20 may be made of a transparent plastic sheet, transparent resin or other transparent materials.

The technical features of the above embodiments can be combined arbitrarily. In order to make the description concise, all possible combinations of the technical features in the above embodiments are not described. However, as long as there is no contradiction in the combination of these technical features, it should be considered that these are within the range described in this specification.

The above examples only express several implementations of the application, and the descriptions are more specific and detailed, but they should not be interpreted as a limitation on the scope of the patent application. It should be pointed out that for those of ordinary skill in the art, without departing from the concept of this application, several variants and modifications can be made, and these all fall within the protection scope of this application. Therefore, the scope of protection of the patent in this application shall be subject to the appended claims.

What is claimed is:

1. A positioning device used in conjunction with the-a protective leather case comprising:
   a leather layer:
   an adhesive layer; and
   a positioning release film,
   wherein the leather layer, the adhesive layer and the positioning release film are laminated sequentially, the positioning release film comprises a first release film and at least two second release films, the first release film is provided in a first direction, and the at least two second release films are arranged on opposing sides of the first release film in a second direction perpendicular to the first direction,
   the positioning device comprising a positioning piece provided with a positioning boss that matches a charging interface of a smart terminal, the leather layer is provided with a first charging interface opening that matches the charging interface of the smart terminal, the positioning release film is provided with a second charging interface opening that matches the charging interface of the smart terminal, the positioning boss is configured to extend through the first charging interface opening and the second charging interface opening, so as to position the leather layer, the positioning release film, and the smart terminal.

2. The positioning device according to claim 1, wherein the positioning piece is further provided with a positioning hole that matches a receiver of the smart terminal, the leather layer is provided with a first receiver hole that matches the receiver of the smart terminal, the positioning release film is provided with a second receiver hole that matches the receiver of the smart terminal.

3. The positioning device according to claim 1, further comprising a holding piece, a side of the holding piece being fixedly connected to the positioning piece.

4. The positioning device according to claim 3, wherein the holding piece and the positioning piece are an integrally formed sheet structure.

5. The positioning device according to claim 1, wherein the positioning device is made of a transparent material.

* * * * *